April 6, 1965  A. GIEBHART  3,176,748
TIRE FOR VEHICLES WITH PROFILED TIRE SHOULDERS
Filed Dec. 6, 1963
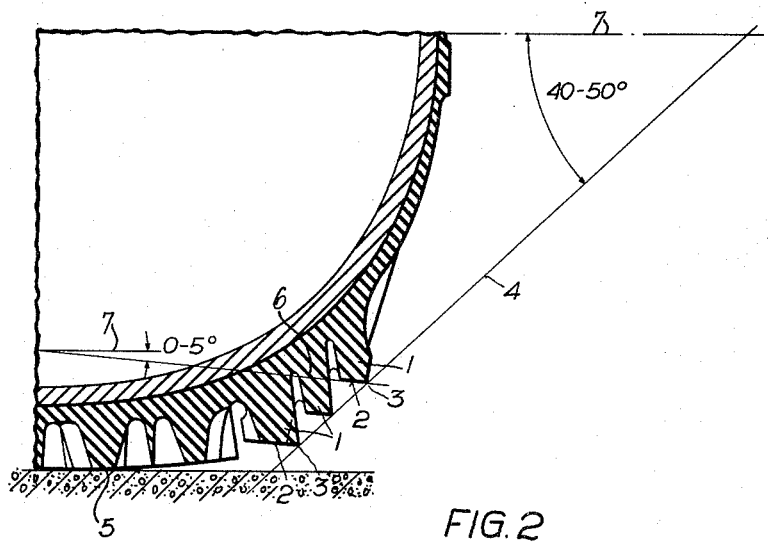
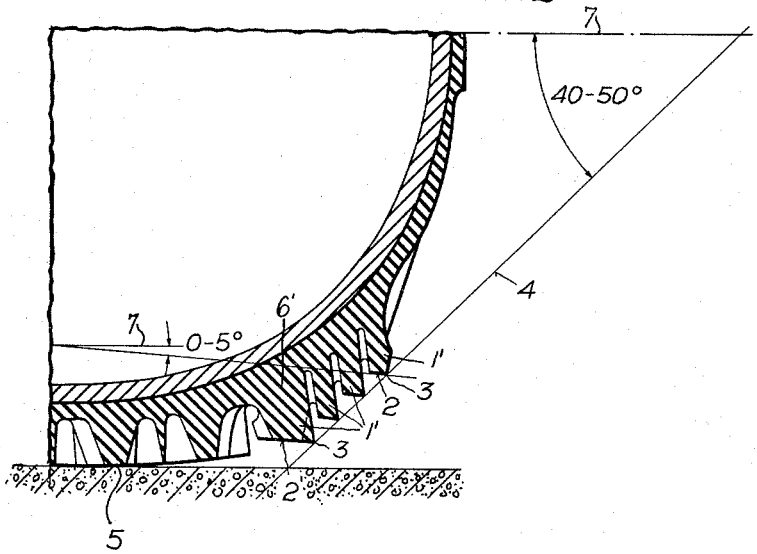
INVENTOR.
Anton Giebhart
BY
Attorney United States Patent Office 3,176,748
Patented Apr. 6, 1965

3,176,748
TIRE FOR VEHICLES WITH PROFILED TIRE SHOULDERS
Anton Giebhart, Baden, near Vienna, Austria, assignor to Firma Semperit Osterreichisch-Amerikanische Gummiwerke Aktiengesellschaft, Vienna, Austria, a corporation of Austria
Filed Dec. 6, 1963, Ser. No. 328,588
Claims priority, application Austria, Dec. 11, 1962, A 9,657/62
4 Claims. (Cl. 152—209)

The present invention relates to a tire for vehicles with a particular profile of its tire shoulders, which are edged relative to the substantially cylindrical running surface.

In tires for multi-track vehicles it is known to provide the tire with a profile, which extends beyond the actual running surface to the tire shoulders, in order to prevent a lateral sliding, in particular during the traveling in curves. As a rule, the usual sharp edged transfers from the running surface into the side walls within the range of the shoulders are rounded up and the profile is extended beyond these rounded shoulders. The running faces of the rows of ribs or blocks provided by the profile within the shoulder range are disposed thereby parallel either inside or outside of a line defining the running face, in accordance with a known embodiment, whereby the running faces of the rows of ribs or blocks are stepped up relative to each other. The lateral sliding safety is thereby increased, in particular, if the tire is deformed under the action of centrifugal forces of the vehicle, for instance, during travel in curves, and the tire shoulder thereby disposed on the outside of the curve comes into engagement more or less on the road in response to the speed of the vehicle.

It is one object of the present invention to provide a tire for vehicles with profiled tire shoulders, wherein a still more effective stability of the tire during travel in curves is brought about by a particular design of the shoulder zones of the tire.

It is another object of the present invention to provide a tire for vehicles with profiled tire shoulders, wherein the shoulders have rows of ribs or blocks extending in the direction of the periphery of the tire in straight, wavelike or zigzag-like lines, such that the running faces of the rows of ribs or blocks arranged within the range of the edged tire shoulders are disposed substantially parallel to the plane of the road, and the running faces in the individual rows are set off stepwise.

It is still another object of the present invention to provide a tire for vehicles with profiled tire shoulders, wherein the edged, imaginary surrounding line, which connects the outer step edges of the individual shoulder ribs, forms an angle of 40° to 50° with the horizontal center lines of the tire and the plane of the running faces of the individual shoulder extends at an angle of 0° to 5° relative to the horizontal center line of the tire.

With these and other objects in view, which will become apparent in the following detailed description, the present invention will be clearly understood in connection with the accompanying drawing, in which:

FIGURE 1 is a fragmentary cross-section of a tire disclosing a first embodiment of the shoulder zone according to the present invention; and FIG. 2 is a fragmentary cross-section of a tire disclosing a second embodiment of the shoulder zone according to the present invention.

Referring now to the drawing, the tire comprises a running portion 5 which forms in passing to the tire shoulders 6 an edged imaginary line 4. A plurality of ribs 1 are disposed within this imaginary line 4 in the range of the tire shoulders 6, which ribs 1 have such cross-section, that their running faces 2 are set off like stairs. By this arrangement stepped up edges 3 are formed, which come into action one after the other in case the tire enters a curve, whereby they penetrate safely a layer of lubricant or a water film on the road, so that a direct contact with the road is brought about and thus an increased security against sliding is ensured. By the stair-like set off of the tire shoulders, the crossing of rail edges extending in the direction of movement and the crossing of road steps is also simplified.

In accordance with a preferred embodiment of the present invention, the edging of the tire shoulders 6 is arranged such, that the imaginary line 4 connecting the outer step edges 3 of the individual shoulder ribs 1 forms an angle of 40 to 50° with the horizontal center line 7 of the tire. The planes of the running faces 2 extend suitably parallel to the horizontal center line 7 of the tire, yet they can also be inclined up to an angle of 5° relative to the latter. While in FIG. 1 the tire shoulder 6 has three rows of ribs 1, in FIG. 2 the tire shoulder 6' is equipped with four such rows of ribs 1'. It is to be understood, however, that the number of rows of ribs can preferably vary between two and five. The stability of the ribs 1 or 1' is obtained by forming the base of the grooves between each pair of adjacent ribs in wave-shape or zigzag-shape.

During the traveling operation in a straight direction the normally shaped, substantially cylindrical and slightly curved running face, respectively, of the tire is in contact with the road. As to the gripping power and the wear, the running face is though supported by the immediately adjacent circumferential ribs of the tire shoulder, yet, the main function of the tire shoulders designed in accordance with the present invention, sets in, as set forth above, during the travel in curves, or, if a stronger lateral deformation of the tire body takes place for other reasons.

While I have disclosed several embodiments of the present invention, it is to be understood that these embodiments are given by example only and not in a limiting sense, the scope of the present invention being determined by the objects and the claims.

I claim:
1. A tire for vehicles, comprising
   a center zone having a plurality of rows of first ribs extending in peripheral direction of said tire, said center zone being adapted to engage the road during straight normal travel,
   a shoulder zone disposed laterally on each side of said center zone and having a plurality of rows of second ribs extending in peripheral direction of said tire, said shoulder zones being adapted not to engage the road during normal straight travel, but to engage the road with one of the shoulder zones during travel in a curve,
   said second ribs of said shoulder zones having running faces disposed substantially parallel to an imginary horizontal center line across said tire, and are separated from each other by grooves, and
   said running faces of successive rows of said second ribs being set off in stair-like manner and substantially parallel relative to each other and spaced apart from an imaginary horizontal line extending substantially tangentially crosswise the road engaging faces of said first ribs.
2. The tire, as set forth in claim 1, wherein
   the outer edges of said running faces of said rows of second ribs are disposed on an upwardly inclined imaginary line extending at an angle of 40° to 50° towards an imaginary center line across said tire.

3. The tire, as set forth in claim 1, wherein
said running faces of said second ribs are disposed upwardly and inwardly at an angle of 0° to 5° towards an imaginary center line across said tire.

4. The tire, as set forth in claim 1, wherein
each of said shoulder zones has two to five rows of said second ribs, and
said rows extend substantially parallel to each other about the periphery of said shoulder zones of said tire.

References Cited by the Examiner
UNITED STATES PATENTS 2,621,698  12/52  Zohrer _____ 152—209
3,024,825  3/62   Kutsmichel _____ 152—209

FOREIGN PATENTS 206,340  11/39  Switzerland.

ARTHUR L. LA POINT, *Primary Examiner.*